United States Patent [19]

Duchesne et al.

[11] Patent Number: 5,015,693

[45] Date of Patent: May 14, 1991

[54] EXTRUDABLE THERMOPLASTIC HYDROCARBON POLYMER COMPOSITION

[75] Inventors: Denis Duchesne; Bryce V. Johnon, both of St. Paul, Minn.

[73] Assignee: Minnesota Mining and Manufacturing Company, St. Paul, Minn.

[21] Appl. No.: 356,062

[22] Filed: May 23, 1989

Related U.S. Application Data

[62] Division of Ser. No. 182,028, Apr. 15, 1988, Pat. No. 4,855,360.

[51] Int. Cl.$^5$ .................... C08L 27/16; C08L 27/14; C08L 71/02
[52] U.S. Cl. .................... 525/187; 525/186; 524/277; 524/278
[58] Field of Search ........... 525/187, 186; 524/277, 524/278

[56] References Cited

U.S. PATENT DOCUMENTS

| | | | |
|---|---|---|---|
| 2,968,649 | 1/1961 | Pailthorp et al. | 260/80.5 |
| 3,005,795 | 10/1961 | Busse et al. | 525/187 |
| 3,051,677 | 8/1962 | Rexford | 260/29.6 |
| 3,125,547 | 3/1964 | Blatz | 260/45.5 |
| 3,318,854 | 5/1967 | Honn et al. | 260/87.7 |
| 4,013,622 | 3/1977 | DeJuneas et al. | 260/45.95 |
| 4,129,717 | 12/1978 | Praetorius et al. | 528/421 |
| 4,159,975 | 7/1979 | Praetorius et al. | 525/91 |
| 4,293,663 | 10/1981 | Stivers | 525/187 |
| 4,413,094 | 11/1983 | Aufdermarsh | 525/187 |
| 4,581,406 | 4/1986 | Hedberg et al. | 524/520 |
| 4,737,547 | 4/1988 | White | 525/193 |

FOREIGN PATENT DOCUMENTS

961998 1/1975 Canada ................... 400/67

OTHER PUBLICATIONS

Westover, R. F. "Melt Extrusion", *Encyclopedia of Polymer Science and Technology*, 8, John Wiley & Sons, (1968) pp. 573–581.

Rudin, A., Worm, A. T., Blacklock, J. E., "Fluorocarbon Elastomer Aids Polyolefin Extrusion", *Plastics Engineering*, Mar., 1986, pp. 63–66.

De Smedt, C. Nam, S., "The Processing Benefits of Fluoroelastomer Application in LLDPE", *Plastics and Rubber Processing and Applications*, 8, No. 1, (1987), pp. 11–16.

3M Company brochure "Parr Bomb Analytical Method for Determining Total Organic Fluorine Concentration in Polyethylene" Brochure No. 98-0211-2542-6, issued 12/86, p. 11, Lines 23–26.

*Primary Examiner*—Carman J. Seccuro
*Attorney, Agent, or Firm*—Donald M. Sell; Walter N. Kirn; Eloise J. Maki

[57] ABSTRACT

An extrudable composition comprising thermoplastic hydrocarbon polymer, poly(oxyalkylene) polymer and fluorocarbon polymer. The poly(oxyalkylene) polymer and the fluorocarbon polymer are present in the composition in such relative proportions and concentrations as to reduce the occurence of melt defects during the extrusion of said hydrocarbon polymer composition.

14 Claims, No Drawings

EXTRUDABLE THERMOPLASTIC HYDROCARBON POLYMER COMPOSITION

This is a continuation of U.S. application Ser. No. 182,028 filed Apr. 15, 1988, now U.S. Pat. No. 4,855,560.

This invention relates to thermoplastic hydrocarbon polymers, such as polyolefins, having improved extrusion characteristics. In another aspect it relates to the use of fluorocarbon polymers to improve the extrusion characteristics of such thermoplastic hydrocarbon polymers. In still a further aspect it relates to the use of polyalkylene glycol to improve the extrusion characteristics of such thermoplastic hydrocarbon polymers. In a still further aspect it relates to a polymer processing aid composition.

Westover, R. F., "Melt Extrusion", *Encyclopedia of Polymer Science and Technology*, Vol. 8, John Wiley & Sons, (1968) pp 573–581 states that for any polymer there is a certain critical shear rate above which the surface of the extrudate becomes rough and below which the extrudate will be smooth. He further states that in order to achieve the highest possible flow rate from the extruder and to achieve the most uniform extrudate cross section the processor must control extrudate roughness or distortion Some of the various types of extrudate roughness and distortion observed in high and low density polyethylenes are described in Rudin, A., Worm, A. T., Blacklock J. E., "Fluorocarbon Elastomer Aids Polyolefin Extrusion," *Plastics Engineering*, March 1986, pp. 63–66. Rudin et al. state that for a given set of processing conditions and die geometry, a critical shear stress exists above which polyolefins like linear low-density polyethylene (LLDPE), high-density polyethylene (HDPE), and polypropylene suffer from melt defects. At low shear rates, defects may take the form of "sharkskin", a loss of surface gloss, which in more serious manifestations, appears as ridges running more or less transverse to the extrusion direction. At higher shear rate the extrudate can undergo "continuous melt fracture" becoming grossly distorted. At rates lower than those at which continuous melt fracture is first observed, LLDPE and HDPE can also suffer from "cyclic melt fracture", in which the extrudate surface varies from smooth to rough. The authors state that lowering the shear stress by adjusting the processing conditions or changing the die can avoid these defects to a certain extent, but not without creating a whole new set of problems. For example, extrusion at a higher temperature can result in weaker bubble walls in tubular film extrusion, and a wider die gap can affect film orientation. The authors state that the use of fluorocarbon elastomer processing aids can permit the operation of extruders with narrower die gaps and lower melt temperatures. Others have also described the use of fluorocarbon elastomers as processing aids, see for example, De Smedt, C., Nam, S., "The Processing Benefits of Fluoroelastomer Application in LLDPE," *Plastics and Rubber Processing and Applications*, 8, No. 1, (1987), pp. 11–16; U.S. Pat. Nos. 3,125,547 (Blatz), and 4,581,406 (Hedberg et al.).

The use of polyethylene glycol as an extrusion processing aid has been described. For example, U.S. Pat. No. 4,013,622 (DeJuneas et al.) disclose the use of polyethylene glycol to reduce the incidence of breakdown of polyethylene in the extruder, and Canadian Pat. No. 961998 (Hancock et al.) disclose the use of anti-oxidant-stabilized, polyolefin-based film extrusion compounds and polyalkylene glycol to prevent gel streak formation during extrusion.

The present invention provides an extrudable composition comprising
(A) thermoplastic hydrocarbon polymer, e.g. polyethylene, as the major or predominant component of the composition,
(B) poly(oxyalkylene) polymer, and
(C) fluorocarbon polymer
where said poly(oxyalkylene) polymer and said fluorocarbon polymer are present in said extrudable composition in such relative proportions and at concentrations which in combination or in concert, are sufficient to reduce melt defects, i.e. those defects which sometimes appear in extruded thermoplastic hydrocarbon polymers such as sharkskin, continuous melt fracture and cyclic melt fracture.

Generally, the weight of said fluorocarbon polymer in said extrudable composition and the weight of said poly(oxyalkylene) present in said extrudable composition are in a ratio of 1/1 to 1/10. Where said extrudable composition is a final extrudate, i.e. the final product for example a film, the concentration of said fluorocarbon polymer in said composition is 0.005 to 0.2 weight percent and the concentration of said poly(oxyalkylene) polymer in said composition is 0.01 to 0.8 weight percent, where said weight percent is based on the total weight of the extrudate.

This invention also provides a polymer processing aid composition comprising fluorocarbon polymer and poly(oxyalkylene) polymer such that the weight of said fluorocarbon polymer in said processing aid composition and the weight of said poly(oxyalkylene) polymer in said processing aid composition are in a ratio of 1/1 to 1/10. Optionally, said processing aid composition further comprises other components such as adjuvants, e.g. antioxidants, normally added to thermoplastic hydrocarbon polymers. The concentration of said fluorocarbon polymer poly(oxyalkylene) polymer, and any other adjuvants in said processing aid composition can vary depending upon the processor's requirements, but generally, the fluorocarbon polymer and poly(oxyalkylene) polymer will be the major or predominant component of the composition.

The present invention is effective in reducing melt defects not only by delaying the onset of melt defects in thermoplastic hydrocarbon polymers to higher extrusion shear rates than could be achieved using the same level of the fluorocarbon polymer alone, but also by permitting the extruder to equilibrate and produce melt-defect-free extrudate in less time than would be required for an extrudate containing the same level of fluorocarbon polymer alone at the same extrusion conditions. This permits the use of less fluorocarbon polymer as well as higher extruder throughputs and shorter extruder start up times, resulting in more economical thermoplastic hydrocarbon polymer extrusion.

The thermoplastic hydrocarbon polymers to which the fluorocarbon polymers and poly(oxyalkylene) polymers are added comprise polymers obtained by the homopolymerization or copolymerization of olefins, as well as copolymers of one or more olefins and up to about 30 weight percent, but preferably 20 weight percent or less, of one or more monomers which are copolymerizable with such olefins, e.g. vinyl ester compounds such as vinyl acetate. Said olefins have the general structure $CH_2=CHR$, where R is a hydrogen or an alkyl radical, and generally, the alkyl radical contains not more than 10 carbon atoms and preferably one to four carbon atoms. Representative olefins are ethylene, propylene, and butene-1. Representative monomers which are copolymerizable with said olefins are vinyl ester monomers such as vinyl acetate, vinyl propionate, vinyl butyrate, vinyl chloroacetate, vinyl chloropropionate, acrylic and alpha-alkyl acrylic acid monomers, and their alkyl esters, amides, and nitriles such as acrylic acid, methacrylic acid, ethacrylic acid, methyl acrylate, ethyl acrylate, N,N-dimethyl acrylamide, methacrylamide, acrylonitrile, vinyl aryl monomers such as styrene, o-methoxystyrene, p-methoxystyrene, and vinyl naphthalene, vinyl and vinylidene halide monomers such as vinyl chloride, vinylidene chloride, vinylidene bromide, alkyl ester monomers of maleic and fumaric acid such as dimethyl maleate, diethyl maleate, vinyl alkyl ether monomers such as vinyl methyl ether, vinyl ethyl ether, vinyl isobutyl ether, 2-chloroethyl vinyl ether, and vinyl pyridine monomers, N-vinyl carbazole monomers, and N-vinyl pyrolidine monomers. The thermoplastic hydrocarbon polymers also include the metallic salts of said olefin copolymers, or blends thereof, which contain free carboxylic acid groups Illustrative of the metals which can be used to provide the salts of said carboxylic acid polymers are the one, two and three valence metals such as sodium, lithium, potassium, calcium, magnesium, aluminum, barium, zinc, zirconium, beryllium, iron, nickel and cobalt. The thermoplastic hydrocarbon polymers also include blends of thermoplastic hydrocarbon polymers with other thermoplastic hydrocarbon polymers or copolymers or blends thereof containing conventional adjuvants such as antioxidants, light stabilizers, fillers, antiblocking agents and pigments. Representative examples of hydrocarbon polymers useful in this invention are polyethylene, polypropylene, polybutene-1, poly(3-methylbutene), poly(4-methylpentene) and copolymers of ethylene with propylene, butene-1, hexene-1, octene-1, decene-1, 4-methyl-1-pentene and octadecene-1.

Representative blends of thermoplastic hydrocarbon polymers useful in this invention are blends of polyethylene and polypropylene, low-density polyethylene and high-density polyethylene, and polyethylene and olefin copolymers containing said copolymerizable monomers, some of which are described above, e.g., ethylene and acrylic acid copolymers; ethylene and methyl acrylate copolymers; ethylene and ethyl acrylate copolymers; ethylene and vinyl acetate copolymers; ethylene, acrylic acid, and ethyl acrylate copolymers, and ethylene, acrylic acid, and vinyl acetate copolymers.

The preferred thermoplastic hydrocarbon polymers are homopolymers of ethylene and propylene and copolymers of ethylene and 1-butene, 1-hexene, 1-octene, 4-methyl-1-pentene, propylene, vinyl acetate, and methyl acrylate.

The thermoplastic hydrocarbon polymers may be used in the form of powders, pellets, granules, or any other extrudable form.

The fluorocarbon or fluorinated polymers useful in this invention are generally homopolymers and copolymers of fluorinated olefins having a fluorine atom-to-carbon atom ratio of at least 1:2, preferably at least 1:1. Homopolymers which can be used are those derived, for example, from vinylidene fluoride and vinyl fluoride. Copolymers of fluorinated olefins can be those derived, for example, from vinylidene fluoride, and one or more additional olefins, which can be fluorinated, e.g. hexafluoropropylene, or non-fluorinated, e.g. propylene.

Preferred fluorocarbon polymers are copolymers of vinylidene fluoride with at least one terminally unsaturated fluoromonoolefin containing at least one fluorine atom on each double-bonded carbon atom, each carbon atom of said fluoromonoolefin being substituted only with fluorine, chlorine, bromine, hydrogen or lower fluoroalkyl (e.g. perfluoroalkyl having one to four carbon atoms) or fluoroalkoxy radical, (e.g. perfluoroalkoxy having one to four carbon atoms) Preferred comonomers with vinylidene fluoride are perfluoropropylene, tetrafluoroethylene, chlorotrifluoroethylene, and pentafluoropropylene Particularly preferred are the fluorinated polymers produced by copolymerizing perfluoropropylene and vinylidene fluoride, as described in U.S. Pat. Nos. 3,051,677 (Rexford) and 3,318,854 (Honn, et al.) and those polymers produced by copolymerizing perfluoropropylene, vinylidene fluoride and tetrafluoroethylene as described in U.S. Pat. No. 2,968,649 (Pailthorp et al.). The elastomeric copolymers of perfluoropropylene and vinylidene fluoride having between about 15 and about 50 mole percent perfluoropropylene, optionally with the addition of up to 5 to 30 mole percent tetrafluoroethylene, are particularly useful.

The poly(oxyalkylene) polymers useful in this invention can include poly(oxyalkylene) polyols and their derivatives, and a useful class of poly(oxyalkylene) polymers can be represented by the general formula $$A[(OR^1)_x OR^2]_y \qquad \mathrm{I}$$

where A is an active hydrogen-free residue of a low molecular weight, initiator organic compound having a plurality of active hydrogen atoms (e.g. 2 or 3), such as a polyhydroxyalkane or polyether polyol, e.g. ethylene glycol, glycerol, 1,1,1-trimethylol propane, and poly(oxypropylene) glycol; y is 2 or 3; the $(OR^1)_x$ is a poly(oxyalkylene) chain having a plurality of oxyalkylene groups, $(OR^1)$, wherein the $R^1$ radicals can be the same or different, and are selected from the group consisting of $C_1$ to $C_5$ alkylene radicals and preferably $C_2$ or $C_3$ alkylene radicals; and x is the number of oxyalkylene units. Said poly(oxyalkylene) chain can be a homopolymer chain, e.g. poly(oxyethylene) or poly(oxypropylene), or can be a chain of randomly distributed (i.e., a heteric mixture) oxyalkylene groups, e.g. a copolymer of $-OC_2H_4$ and $-OC_3H_6$ units, or can be a chain having alternating blocks or backbone segments of repeating oxyalkylene groups e.g, a polymer comprising $+OC_2H_4\frac{1}{4}a$ and $-OC_3H_6)_b$ blocks, where $a+b=x$, and x is about 5 to about 500 and preferably about 10 to 300. $R^2$ is H or an organic radical such as alkyl, aryl or combination thereof such as aralkyl or alkaryl, and may contain hetero atoms such as O or N. For example, $R^2$ can be methyl, butyl, phenyl, benzyl, and acyl groups such as acetyl ($CH_3CO-$), benzoyl ($C_6H_5CO-$) and stearoyl ($C_{17}H_{35}CO-$).

Representative poly(oxyalkylene) polymer derivatives can include poly(oxyalkylene) polyol derivatives wherein the terminal hydroxy groups have been partly or fully converted to ether derivatives, e.g., methoxy groups, or ester derivatives, e.g. stearate groups, ($C_{17}H_{35}COO-$). Other useful poly(oxyalkylene) derivatives are polyesters, e.g. prepared from dicarboxylic acids and poly(oxyalkylene) glycols. Preferably, the major proportion of the poly(oxyalkylene) polymer derivative by weight will be the repeating oxyalkylene groups, (OR). Said poly(oxyalkylene) polyols and their derivatives can be liquids or solids at room temperature and have a molecular weight of at least 200 and preferably a molecular weight of about 400 to 20,000 or higher, e.g. 200,000 or more.

Poly(oxyalkylene) polyols useful in this invention include those sold under the trademark CARBOWAX, such as CARBOWAX ™ 3350, $H(OC_2H_4)_nOH$, where n is about 76, and those sold under the trademark PLURONIC e.g. PLURONIC ™ F-77, $H(OC_2H_4)_d[OCH(CH_3)CH_2]_e(OC_2H_4)_fOH$, where d+f is about 108, and e is about 35.

Preferred poly(oxyalkylene) polymers are poly(oxyethylene) glycols, often referred to as polyethylene glycols, having a molecular weight of about 1000 to 20,000.

The addition of fluorocarbon polymer and poly(oxyalkylene) polymer to the thermoplastic hydrocarbon polymer can be accomplished by any of the means conveniently employed to add adjuvants to polymers Thus the fluorocarbon polymer and poly(oxyalkylene) polymer can be added to the hydrocarbon polymer in a Banbury mixer, or a mixing extruder. Generally, the mixing operation is carried out at a temperature above the melting point of the polymer to provide uniform distribution of the fluoroca,rbon polymer and poly(oxyalkylene) polymer throughout the thermoplastic hydrocarbon polymer. The fluorocarbon polymer and the poly(oxyalkylene) polymer can each be individually coated from solution onto the thermoplastic hydrocarbon polymer resin to create masterbatches of coated resin which are then dry blended with an appropriate quantity of the uncoated hydrocarbon resin to achieve the desired concentrations of fluorocarbon polymer and poly(oxyalkylene) polymer in the extrudable composition.

The processing aid composition can be prepared by blending the components using any of the means conveniently employed to add adjuvants to polymers. Thus the fluorocarbon polymer, poly(oxyalkylene) polymer and any other adjuvants can be blended using a Banbury mixer, a mixing extruder or can be dry blended using a mixer. Generally, the mixing operation is carried out at a temperature above the melting point of the fluorocarbon polymer and poly(oxyalkylene) polymer to provide uniform distribution of components in the composition.

The amount of fluorocarbon polymer and poly(oxyalkylene) polymer used in said extrudable compositions or said processing aid composition can vary and will be dependent upon such factors as the type of hydrocarbon polymer used, the type of fluorocarbon polymer used, the type of poly(oxyalkylene) polymer used, and extrusion conditions. Stated functionally, the amount of fluorocarbon polymer and poly(oxyalkylene) polymer used in the extrudable composition or processing and composition will be that amount sufficient to reduce melt defects in a hydrocarbon polymer when the same is extruded. Generally the weight of said fluorocarbon polymer present in said extrudable composition or in said processing aid composition and the weight of said poly(oxyalkylene) polymer present in said extrudable composition or in said processing aid composition are in a ratio of 1/1 to 1/10, and preferably in a ratio of 1/2 to 1/6. Generally, said extrudable compositions will contain 0.005 to 0.2 weight % fluorocarbon polymer and 0.01 to 0.8 weight % poly(oxyalkylene) polymer based on total composition weight. Preferably, said extrudable compositions will contain 0.02-0.08 weight % fluorocarbon polymer and 0.04-0.24 weight % poly(oxyalkylene) polymer based on total composition weight. Generally, the fluorocarbon polymer and poly(oxyalkylene) polymer will be the major or predominant components of said processing aid composition, and preferably said processing aid composition will contain 10 to 90 weight percent of poly(oxyalkylene) polymer and 10 to 50 weight percent of fluorocarbon polymer, where said weight percent is based on total processing aid composition weight.

This invention is useful in the extrusion of thermoplastic hydrocarbon polymers, which includes for example, extrusion of films, extrusion blow molding, injection molding, pipe, wire or cable extrusion, and fiber production.

The following examples are offered to aid in a better understanding of the present invention and are not to be unnecessarily construed as limiting the scope thereof.

EXAMPLES 1, 2 and COMPARATIVE EXAMPLES C1 to C4

The following examples illustrate the significant increase in shear rate which can be obtained before the onset of melt defects during the extrusion of polyethylene by using polyethylene glycol and fluorocarbon polymer.

The polyethylene used was a commercially available, linear low density polyethylene (LLDPE), with a melt index of 1.0, containing about 2 wt. % butene-1 comonomer and 0.03 weight % of the antioxidant, octadecyl-3-(3,5-di-tert-butyl-4-hydroxyphenyl) propionate.

Two polyethylene glycols were used in these experiments, CARBOWAX ™ 400 (PEG-1) with a molecular weight of about 400, and CARBOWAX ™ 3350 (PEG-2) with a molecular weight of about 3350.

The fluorocarbon polymer used was DYNAMAR ™ Polymer Processing Additive FX-9613, which is a copolymer of vinylidene fluoride and hexafluoropropylene containing 10 weight percent inorganic partitioning agent. Said polymer had a Mooney viscosity (as determined by ASTM D1646-81, ML 1+10 at 121° C.) of 33.

Compositions containing DYNAMAR∩FX-9613 were prepared by blending an appropriate amount of FX-9613 and the polyethylene resin on a production scale, continuous Banbury mixing system. Initial blending of the resin and the FX-9613 was done on a ribbon blender which was fed continuously to a Mixtrument mixer. Following extrusion, the material was pelletized. Fluorine analyses of the resin (performed according to the Parr Bomb analytical method described in the 3M Company brochure "Parr Bomb Analytical Method for Determining Total Organic Fluorine Concentration in Polyethylene", brochure number 98-0211-2542-6, issued 12/86) confirmed the presence of the desired levels of FX-9613. The polyethylene resin used in compositions which did not contain FX-9613 was compounded according to the same procedure described for those containing FX-9613. This was to eliminate the effect of shear history in comparison with the FX-9613-containing blends. Further compounding of samples with PEG-1 or PEG-2 was done with an HBI System 40 Torque Rheometer using a Rheomix 3000 mixer. A residence time of three minutes at 50 rpm was sufficient in each case to obtain a constant torque with a final melt temperature of 200°-210° C. The compounded resins were ground prior to extrusion to facilitate feeding of the capillary rheometer.

Rheological studies to determine the shear rate at which the onset of melt fracture occurred in the samples were done on an Instron Model 4202 System with a 3210 Capillary Rheometer using a 0.51 mm die with length/diameter ratio of 40/1 and a 60 degree entrance angle. A dwell time of 10 minutes and a temperature of 210° C were used. Photomicrographs of air-cooled capillary extrudates were visually examined to determine the level of melt fracture. The compositions of extrudates, and shear rates at onset of melt fracture are summarized in Table 1.

TABLE 1

| Ex. | Additives | | | Shear rate at onset of melt defect (s$^{-1}$) |
|---|---|---|---|---|
| | FX-9613 (%) | Polyethylene glycol | | |
| | | code | level (%) | |
| C1 | 0 | | 0 | <600 |
| C2 | 0.050 | | 0 | 1400 |
| C3 | 0 | PEG-1 | 0.20 | <600 |
| C4 | 0 | PEG-2 | 0.20 | <600 |
| 1 | 0.050 | PEG-1 | 0.20 | 1500 |
| 2 | 0.050 | PEG-2 | 0.20 | 1800 |

The data show that without fluorocarbon polymer, melt defects appear at a shear rate of less than 600 s$^{-1}$. The effect of the fluorocarbon polymer is to delay the appearance of a melt defect until the shear rate reached 1400 s$^{-1}$. The data also shows that polyethylene glycols, regardless of molecular weight, do not delay the onset of melt defects. However, the combination of the fluorocarbon polymer and polyethylene glycol at a synergistic concentration and ratio delayed the onset of melt defects to higher shear rates than fluorocarbon polymer alone. The higher molecular weight polyethylene glycol was more effective in combination with the fluorocarbon polymer.

EXAMPLE 3 and COMPARATIVE EXAMPLES C5–C7

These examples illustrate the synergistic effect of polyethylene glycol in delaying the onset of melt defects to higher extrusion shear rates when added to a normally ineffective, low concentration of a low-viscosity fluorocarbon polymer.

The polyethylene resin used was the same as used in Examples 1 and 2 and Comparative Examples C1–C4. The polyethylene glycol used was PEG-2, the same as that used in Example 2 and Comparative Example C4. The fluorocarbon polymer used was a low-viscosity (Mooney viscosity <5 as determined by the procedure, described in Examples 1, 2), vinylidene fluoride-hexafluoropropylene copolymer.

Separate, 2.0 % by weight, masterbatches of the fluorocarbon polymer and of polyethylene glycol were prepared by coating the respective polymers on polyethylene resin from acetone solutions. Appropriate quantities of each of the coated resins were then dry blended with uncoated polyethylene resin to obtain the desired compositions.

Extrusion studies were carried out to determine the maximum shear rate which could be achieved with the extrudates before the onset of melt defects. The extrusion apparatus used was a single screw extruder with a length/diameter ratio of 24/1, which was fitted with a stainless steel die, length/diameter ratio 9/1, and a 0.508 mm die orifice. The residence time was about 3 minutes and a temperature of 210° C. was used. Extrudate was sampled at various shear rates Photomicrographs of air-cooled samples were, visually examined to detect melt defects The compositions of the extruded compositions and the extrusion results are summarized in Table 2.

TABLE 2

| Ex. | Additives | | Shear rate at onset of melt defect (s$^{-1}$) |
|---|---|---|---|
| | Fluorocarbon polymer, (%) | PEG-2 (%) | |
| C3 | 0 | 0 | 400 |
| C4 | 0.02 | 0 | 400 |
| C5 | 0 | 0.18 | 400 |
| 3 | 0.02 | 0.18 | 1600 |

The data shows that only the combination of polyethylene glycol and fluorocarbon polymer (Example 3) is effective in delaying the onset of melt defects to higher extrusion shear rates.

EXAMPLES 4-6 and COMPARATIVE EXAMPLE C6

In the following examples, a UNIPOL TM polyethylene resin was used. Said resin is a copolymer of ethylene with about 2 weight percent of hexene-1 and has a melt index of 0.7. The fluorocarbon polymer (i.e., FX-9613) was the same as that used in Examples 1 and 2. Three molecular weight ranges of polyethylene glycol were used: CARBOWAX TM 3350, molecular weight approximately 3350 (PEG-2), CARBOWAX TM) 8000, molecular weight approximately 8000 (PEG-4) and CARBOWAX TM 14000, molecular weight approximately 14000 (PEG-3}.

A masterbatch of the fluorocarbon polymer in the polyethylene resin was prepared by dry blending 2.0 weight percent of the fluorocarbon polymer with 98 weight percent of the the polyethylene resin. Using a similar procedure, 2.0 weight percent masterbatches of each of the polyethylene glycols in polyethylene resin were also prepared by dry blending. A 30 weight percent masterbatch of rutile (a TiO$_2$) was also prepared. Appropriate quantities of the polyethylene resin were then blended with appropriate quantities of the desired propylene glycol masterbatch, fluorocarbon polymer masterbatch, and rutile masterbatch to obtain the desired compositions for extrusion. The compositions were dry blended and subsequently compounded with a twin screw extruder and pelletized. The pelletized compositions were then extruded and blown into film using a 4.44 cm lab-sized blown film line with a screw having a length/diameter ratio of 32/1. The die was 5.08 cm in diameter and had a gap of 0.635 mm and a land length of 1.143 cm. The gate pressure limit was 55.2 MPa. The extruder temperature profile ranged from 177° C. to a maximum of 215° C., producing melt temperatures that ranged from 213° C. to 218° C., depending on shear rate.

Film samples were collected at various times during the run. Film samples were placed on an overhead projecter to facilitate the visual identification of the areas of the film containing melt defects. Along a line drawn on the film sample perpendicular to the direction of film extrusion, the widths of areas containing film defects were measured. The sum of the widths containing defects divided by the total width of the film sample gave the percent melt defects. The compositions used, sample times, extruder pressures, and the percent of melt defects in the extruded film are summarized in Table 3.

The data shows that compositions containing only fluorocarbon polymer will not achieve the low levels of percent melt defects that can be achieved when the combination of fluorocarbon polymer and polyethylene glycol are used.

TABLE 3

| Ex. | Additives | | | Extrusion parameters* | | |
|---|---|---|---|---|---|---|
| | FX-9613 (%) | Polyethylene glycol Code | % | Time of sample (min) | Gate pressure (MPa) | Percent melt defect |
| C6 | 0.05 | None | 0 | 0 | 50.3 | 100 |
| | | | | 40 | 50.3 | 58 |
| | | | | 80 | 49.3 | 79 |
| | | | | 120 | 49.0 | 87 |
| 4 | 0.05 | PEG-2 | 0.2 | 0 | 49.0 | 100 |
| | | | | 20 | 49.0 | 4 |
| | | | | 40 | 49.0 | <1 |
| | | | | 60 | 49.0 | 0 |
| 5 | 0.05 | PEG-4 | 0.2 | 0 | 49.0 | 100 |
| | | | | 20 | 48.6 | <1 |
| | | | | 40 | 49.0 | 0 |
| 6 | 0.05 | PEG-3 | 0.2 | 0 | 48.3 | 100 |
| | | | | 20 | 48.3 | 2 |
| | | | | 40 | 48.3 | 0 |

*Shear rate = 275–300 s$^{-1}$
Melt temperature = 213–218° C.

EXAMPLES 7–12 and COMPARATIVE EXAMPLES C7–C14

These examples illustrate the effect of the combination of fluorocarbon polymer and polyethylene glycol in eliminating melt fracture in a polyethylene copolymer containing high levels of silica-based, antiblocking agent, and rutile pigment.

The extrusion apparatus used was an 8.89 cm commercial blown film line with a length/diameter ratio of 24/1, and a 20.32 cm diameter die with a 0.635 mm gap. The operating temperature was 205° C and the shear rate 740 s$^{-1}$.

A UNIPOL TM poleythylene resin used in the following examples was a copolymer of ethylene with about 2 weight percent hexene-1, and had a melt index of about 1.0. The polyethylene glycol used was CARBOWAX TM 8000 (i.e. PEG-4). The fluorocarbon polymer was DYNAMAR TM FX-9613. In the examples summarized in Table 5, the polyethylene resin contained 1.0 weight percent SUPERFLOSS TM, a silica-based antiblocking agent.

Compositions which did not contain rutile (i.e. TiO$_2$) were prepared by dry blending the polyethylene in a granular form with FX-9613, powdered PEG-4, and pellets of a 25 weight percent SUPERFLOSS TM masterbatch. Compositions containing rutile were prepared in a similar fashion except that an appropriate amount of a 50 weight percent rutile masterbatch was also added. These components were dry blended as before, and all compositions were extruded immediately after blending.

The extruded compositions were sampled after 60 minutes and the film samples were evaluated as described in Example 4 to determine the percent melt defects. Samples were taken before 60 minutes when it was observed that all melt defects had dissappeared from the extrudate. The compositions extruded, extrusion parameters, and percent melt defects are summarized in Tables 4 and 5.

The data in Table 4 shows that the same 0 percent melt defects level could be achieved with one half the level of fluorocarbon polymer when polyethylene glycol was also used, than could be achieved when fluorocarbon polymer alone was used. Also the 0 percent melt defect level could be achieved 35 minutes earlier when both fluorocarbon polymer and polyethylene glycol were used.

The data in Table 5 shows that certain ratios of fluorocarbon polymer to polyethylene glycol are more effective in eliminating melt defects than others in this invention. For example, fluorocarbon polymer/polyethylene glycol ratios of 1:1 (Example 8) or 2:1 (Example 11) are not as effective as ratios of 1:4 (Example 9), 1:2 (Example 12), or 3:5 (Example 10). Furthermore, even a levels of as high as 0.1 percent fluorocarbon polymer alone are not as effective as fluorocarbon polymer levels as low as 0.02 pecent when the proper level of polyethylene glycol is also used.

TABLE 4

| Ex. | Additives* | | Extrusion parameters | | |
|---|---|---|---|---|---|
| | FX-9613 (%) | PEG-4 (%) | Time of sample (min) | Melt pressure (MPa) | Percent melt defect |
| C7 | 0 | 0 | 60 | 27.1 | 100 |
| C8 | 0.02 | 0 | 60 | 25.2 | 5 |
| C9 | 0.03 | 0 | 60 | 24.8 | 1 |
| C10 | 0.04 | 0 | 55 | 24.8 | 0 |
| 7 | 0.02 | 0.04 | 20 | 24.5 | 0 |

*Compositions contained 1.0 weight % SUPERFLOSS TM

TABLE 5

| Ex. | Additives* | | Extrusion parameters | | |
|---|---|---|---|---|---|
| | FX-9613 (%) | PEG-4 (%) | Time of sample (min) | Melt pressure (MPa) | Percent melt defect |
| C11 | 0 | 0 | 60 | 29.4 | 100 |
| C12 | 0.03 | 0 | 60 | 28.3 | 80 |
| C13 | 0.06 | 0 | 60 | 26.9 | 75 |
| C14 | 0.10 | 0 | 60 | 26.2 | 40 |
| 8 | 0.02 | 0.02 | 60 | 28.3 | 60 |
| 9 | 0.02 | 0.08 | 58 | 26.5 | 1 |
| 10 | 0.03 | 0.05 | 60 | 26.9 | 50 |
| 11 | 0.04 | 0.02 | 60 | 27.6 | 60 |
| 12 | 0.04 | 0.08 | 20 | 25.2 | 0 |

*Compositions contained 7.0 weight % rutile and 1.0% SUPERFLOSS TM.

EXAMPLES 13 and COMPARATIVE EXAMPLE C15–C16

The following examples illustrate the significant increase in shear rate obtained before onset of melt defects by use of a polyethylene glycol derivative, and fluorocarbon polymer.

The polyethylene resin and the fluorocarbon polymer were the same as that used in Example 4.

A masterbatch containing FX-9613, SUPERFLOSS TM, and a polyethylene glycol distearate (available commercially as HODAG TM 602-S PEG-6000 Distearate) were prepared on a Haake Buchler melt mixer. The masterbatch was then ground and combined with the polyethylene resin to obtain the desired composition. The resulting mixture was then melt mixed and ground into flakes prior to extrusion.

Rheological studies were done on an Instron Model 4202 System with a 3210 Capillary Rheometer using a 0.508 mm die with a length/diameter ratio of 40/1 and a 60 degree entrance angle. A dwell time of 10 minutes and a temperature of 210° C. were used. The extrudates were sampled at various shear rates. Photomicrographs of air-cooled capillary extrudate samples were made and visually examined to determine the onset of melt defects.

The compositions extruded and the extrusion results are summarized in Table 6.

TABLE 6

| Ex. | Additives | | Shear rate at onset of melt defects ($s^{-1}$) |
|---|---|---|---|
| | FX-9613 (%) | HODAG 602-S (%) | |
| C15 | 0 | 0 | <600 |
| C16 | 0.05 | 0 | 1400 |
| 13 | 0.05 | 0.2 | >2000 |

The data shows that the polyethylene glycol distearate ester is effective in combination with fluorocarbon polymer in delaying the onset of melt defects to higher shear rates than fluorocarbon polymer alone.

EXAMPLES 14–17 and COMPARATIVE EXAMPLES C17

The following examples illustrate the effect of polyethylene glycol molecular weight on shear rate obtained before onset of melt defects and the effect on equilibrium viscosity measured at 600 $s^{-1}$ shear rate in this invention.

The polyethylene resin and fluorocarbon polymer were the same as that used in Examples 4. The SUPERFLOSS TM was the same as that used in Example 13. The polyethylene glycols used were PEG-1, molecular weight approximately 400, PEG-4 molecular weight approximately 8000, and CARBOWAX TM 450 (PEG-5), molecular weight approximately 1450, and CARBOWAX TM 20000 (PEG-6), molecular weight approximately 20,000. A masterbatch containing FX-9613, SUPERFLOSS TM, and the appropriate polyethylene glycol were prepared on a Haake Buchler melt mixer. The masterbatch was then ground and combined with the polyethylene resin to obtain the desired composition. The resulting mixture was then melt mixed and ground into flakes prior to extrusion.

Rheological studies were done on an Instron Model 4202 System with a 3210 Capillary Rheometer using a 0.508 mm die with a length/diameter ratio of 40/1 and a 60 degree entrance angle A dwell time of 10 minutes and a temperature of 210° C. were used. Equilibrium viscosities were measured at 600 $s^{-1}$ shear rate and are uncorrected. The extrudates were sampled at various shear rates and photomicrographs of air-cooled capillary extrudate samples were made and were visually examined to determine the onset of melt defects.

The compositions extruded and the results of the rheological studies are summarized in Table 7.

TABLE 7

| Ex. | Polyethylene glycol* | Equil. visc.** (Poise) | Shear rate ($s^{-1}$) |
|---|---|---|---|
| C17 | None | 4580 | 1400 |
| 14 | PEG-1 | 4460 | 1400 |
| 15 | PEG-5 | 3390 | >2000 |
| 16 | PEG-4 | 3450 | >1800 |
| 17 | PEG-6 | 3550 | >2000 |

*All samples contained 0.2 weight percent of the indicated polyethylene glycol, and 0.050 weight percent of FX-9613.
**Equilibrium viscosity measured 600 $s^{-1}$ shear rate.

The data shows that polyethylene glycols of approximately 1450 molecular weight (PEG-5) are much more effective at reducing equilibrium viscosity and delaying the onset of melt defects than are polyethylene glycols of approximately 400 molecular weight (PEG-1) or less. Also, polyethylene glycols of much greater molecular weights are not much more effective at reducing equilibrium viscosity or delaying the onset of melt defects than are polyethylene glycols of approximately 1450 molecular weight.

EXAMPLE 18 AND COMPARATIVE EXAMPLE C18

These examples illustrate the effect of using a fluorocarbon homopolymer. The polyethylene resin and SUPERFLOSS TM were the same as that used in Examples 4–17, the polyethylene glycol was PEG-4, and was used at a 0.2 weight percent level. The fluorocarbon polymer was a homopolymer of vinylidene fluoride and had a molecular weight of approximately 70,000. A masterbatch containing the fluorocarbon polymer, SUPERFLOSS TM, and the polyethylene glycol were prepared on a Haake Buchler melt mixer according to the procedure used for Examples 14–17. Rheological studies were carried out according to the procedures used for Examples 14–17. The equilibrium viscosity at 600 $s^{-1}$ for Example 18 was 3200 Poise, the viscositY for Example C18 which did not contain polyethylene glycol was 4850 Poise. The shear rate at onset of melt defects for Example 18 was 2000 $s^{-1}$ and that for Example C18 was 1600 $s^{-1}$. This indicates that homopolymers of vinylidene fluoride can be effective when combined with poly(oxyalkylene) polymer, in this invention at delaying the onset of melt defects.

Various modifications and alterations of this invention will become apparent to those skilled in the art without departing from the scope and spirit of this invention.

What is claimed is:

1. A processing additive composition comprising fluorocarbon polymer, which if it is a homopolymer, is derived from vinylidene fluoride or vinyl fluoride, and poly(oxyalkylene) polymer such that the weight of said fluorocarbon polymer in said composition and the weight of said poly(oxyalkylene) polymer in said composition are in a ratio of 1/1 to 1/10.

2. The composition of claim 1 further comprising other adjuvants selected from the groups consisting of stabilizers, fillers antiblocking agents and pigments.

3. The composition of claim 2 where said thermoplastic hydrocarbon polymer is selected from the group consisting of homopolymers of ethylene, homopolymers of propylene, copolymers of ethylene and 1-butene, copolymers of ethylene and 1-hexene, copolymers of ethylene and 1-octene, copolymers of ethylene and 4-methyl-1-pentene, copolymers of ethylene and propylene, copolymers of ethylene and vinyl acetate, copolymers of ethylene and ethyl methyl acrylate, and blends thereof.

4. The composition of claim 1 wherein the weight of said fluorocarbon polymer in said composition and the weight of said poly(oxyalkylene) polymer in said composition are in a ratio of 1/1 to 1/6.

5. The composition of claim 1 wherein said poly(oxyalkylene) polymer has a molecular weight of at least 200.

6. The composition of claim 5 wherein said poly(oxyalkylene) polymer has a molecular weight of 400 to 200,000.

7. The composition of claim 6 wherein said poly(oxyalkylene) polymer has a molecular weight of 400 to 20,000.

8. The composition of claim 1 wherein said poly(oxyalkylene) polymer has the general formula:

$$A[(OR^1)_x OR^2]_y$$

where A is an active hydrogen-free residue of a low molecular weight, initiator organic compound having a plurality of active hydrogen atoms; y is 2 or 3; $(OR^1)_x$ is a poly(oxyalkylene) chain having a plurality of oxyalkylene groups, $(OR^1)$, wherein said $R^1$ radicals can be the same or different, and are selected from the group consisting of $C_1$ to $C_5$ alkylene radicals, x is the number of oxyalkylene units, and said poly(oxyalkylene) chain can be a homopolymer chain, or can be a chain of randomly distributed oxyalkylene groups, or can be a chain having alternating blocks or backbone segments of repeating oxyalkylene groups; $R^2$ may contain hetero atoms and is selected from the group consisting of H, alkyl, aryl, or combinations thereof.

9. The composition of claim 8 where said poly(oxyalkylene) polymer is poly(oxyalkylene) polyol or derivative of a poly(oxyalkylene) polyol.

10. The composition of claim 6 where said poly(oxyalkylene) polymer is poly(oxyethylene) glycol.

11. The composition of claim 1 wherein said fluorocarbon polymer is selected from the group consisting of copolymers derived from fluorinated monomers and one or more additional fluorinated or non-fluorinated monomers.

12. The composition of claim 11 wherein said fluorocarbon polymer is a copolymer of vinylidene fluoride and hexafluoropropylene.

13. The composition of claim 11 wherein said fluorocarbon polymer is a copolymer of vinylidene fluoride, hexafluoropropylene, and tetrafluoroethylene.

14. The composition of claim 1 wherein said fluorocarbon polymer is a homopolymer of vinylidene fluoride or vinyl fluoride.

* * * * *